Feb. 26, 1924.

E. S. EATON ET AL 1,485,173

BAKING OVEN

Filed March 8, 1922

Patented Feb. 26, 1924.

1,485,173

UNITED STATES PATENT OFFICE.

EZRA S. EATON, OF NEWTON, MASSACHUSETTS, AND WILLIAM W. CUMMINGS, JR., OF HANOVER, NEW HAMPSHIRE, ASSIGNORS TO THE INDUSTRIAL APPLIANCE CO. OF NEW ENGLAND, OF BOSTON, MASSACHUSETTS, A CORPORATION OF MASSACHUSETTS.

BAKING OVEN.

Application filed March 8, 1922. Serial No. 542,193.

*To all whom it may concern:*

Be it known that we, EZRA S. EATON, a citizen of the United States, residing at Newton, in the county of Norfolk and State of Massachusetts, and WILLIAM WARREN CUMMINGS, Jr., a citizen of the United States, residing at Hanover, in the county of Grafton, and State of New Hampshire, have invented new and useful Improvements in Baking Ovens, which are fully set forth in the following specifications.

This invention relates to certain improvements in baking ovens, and has for its object, to render the process more economical in operation, more uniform in results, and more economical of space.

Hitherto bake ovens have been constructed with shelves more or less fixed or with shelves hung from a horizontal revolving shaft through spiders or with shelves that swing outward from a vertical shaft placed in the side of an oven for convenience in charging.

In such cases either the heated air or gases rose naturally through openings provided for them in the sides of the oven, or the material to be baked was caused to revolve through the heated atmosphere, or products of combustion, or these materials were carried through the heated atmosphere, or products of combustion, by means of a chain to which shelves were attached.

The object of our invention is to provide an easy means of charging the oven, and to cause the heated atmosphere, or products of combustion, to move, instead of moving the material to be baked, or the material to be baked may be caused to move in conjunction with a directed movement of the heated atmosphere, or products of combustion.

The invention consists in the combination and arrangement of parts set forth in the following specification and particularly pointed out in the claims thereof.

Referring to the drawings:—

Figure 1 is a front elevation of an oven embodying our invention.

Fig. 2 is a sectional plan taken on line 2—2 of Figure 1.

Fig. 3 is a sectional elevation taken on line 3—3—3—3, Fig. 2.

Fig. 4 is a sectional elevation taken on line 4—4, Fig. 2. Each of the sections is viewed in the direction of the arrows on the respective section lines referred to.

Like numerals refer to like parts throughout the several views of the drawings.

In the drawings, 5 is a vertically positioned baking cylinder. 6 is a rectangular casing surrounding said cylinder. The cylinder 5 is a stationary cylinder and consists of a top 7, cylindrical wall 8, bottom plate 9, and projecting downwardly from said bottom plate is a cylinder 10, which rests upon the bottom 11 of the casing 6. A shaft 12 is rotatably mounted in bearings 13 and 14 provided upon the casing 6, the bearing 13 being fast to the top 15 of the casing and the bearing 14 being fastened to the bottom 11 of the casing. This shaft may be rotated in any suitable manner, and has fastened thereto a series of shelves 16, 17 and 18 each consisting of a plurality of radial arms 19. Upon the arms 19 are supported segmental grids 20 which consist of a plurality of thin flat pieces of metal 21 rigidly fastened together. These segmental grids rest upon the arms 19 and can be removed therefrom when it is desired to clean the same.

The cylinder 5 has an opening 22 in the front thereof and in alignment with this opening there are provided a series of pairs of doors 23 which slide in ways 24 provided in the front of the casing 6, so that access can be had to the different shelves 16, 17 and 18 by opening the doors 23 and the different grids of each shelf can be brought into alignment with the opening 22 by rotating the shelves and the shaft 12 by means of the arms 19.

A horizontal partition 25 is positioned between the top 7 of the cylinder 8 and the top 15 of the casing 6, whereby a chamber 26 is provided. A damper 27 is positioned upon the partition 25 and is provided with holes 28 which may be brought into or out of alignment with the holes 29 in the partition 25. Another partition 30 extends across the interior of the casing 6 and is provided with a circular opening 31 concentric with the cylinder 5 and of a diameter greater than the diameter of the cylinder 10.

By reference to Fig. 2 it will be seen that by the construction hereinbefore set forth vertical chambers 32, 33, 34 and 35 are embodied in the oven formed by the walls of the casing 6 and by the wall of the cylinder 5 and these vertical chambers extend vertically from the partition 30 to the partition 25. In the chamber 35 a flue 36 is provided which extends from the partition 25 down to the base 11 and opens at its upper end through the partition 25 into the chamber 26. At its lower end the flue 36 is connected to the interior of the cylinder 10 by a passage 37 which constitutes a portion of the flue 36 and is formed by side walls 38 and 39 and by a portion of the base 11 and by a top plate 40.

The cylinder 5 is provided in the top 7 thereof with holes 41 and in its cylindrical wall 8 with holes 42. A burner 43 is provided in the lower part of the casing beneath the partition 30, and the front of the casing is provided with an opening 44 to admit air to the said burner, see Figure 1.

A pipe 45 constituting an outlet flue extends through the top 15 of the casing and into the chamber 26. A damper 46 is employed to open or close the pipe 45. A fan 47 is fast to a shaft 48, rotatably mounted in a bearing 49 in the top of the casing 6 and said shaft and fan are rotated by an electric motor 50 positioned on the top of the casing.

In the drawings only one grid has been illustrated in plan view, Fig. 2, but it is understood that each of the shelves 16, 17 and 18 are provided with a plurality of grids.

The general operation of the oven hereinbefore specifically described is as follows:—

The articles to be baked are placed upon the shelves 16, 17 and 18, access being obtained to the different segmental grids of the different shelves by rotating the shelves by hand, thus rotating the shaft 12. After the articles have been placed on the shelves the doors 23 are closed. The burner 43 heats the air which enters the casing through the opening 44 and the heated gases pass upwardly through the opening 31 in the partition 30 along the bottom wall 9 of the baking cylinder and thence upwardly through the vertical chambers 32, 33, 34 and 35, entering the interior of the cylinder, a portion of the heated gases being drawn into the interior of the cylinder through the openings 42 in the wall thereof, and a portion of the heated gases passing up over the top 7 of the cylinder and downwardly through the holes 41 into the interior of the baking cylinder. The heated gases then pass down through the different shelves contacting with the articles to be baked and finally pass down through the cylinder 10 and into the passage 37 and upwardly through the flue 36, the heated gases being drawn through the path hereinbefore described by the fan 47, to which a rapid motion is imparted by the electric motor 50.

Assuming the damper 27 to be closed and the damper 46 to be open, then the heated gases will pass from the flue 36 into the chamber 26 and out of the casing through the pipe 45.

If it is desired to recirculate the heated gases through the oven, the damper 46 is closed or partly closed and the damper 27 is opened, whereupon the heated gases, after they pass from the flue 36 into the chamber 26 will be drawn downwardly through the openings 28 in the damper 27 and through the openings 29 in the partition 25 and the openings 41 in the top of the baking cylinder 8, thence downwardly through the different grids, as before, and outwardly through the passage 37 and flue 36. Thus the heated gases can be recirculated through the oven as many times as desired and finally can be caused to pass through the pipe 45 to the atmosphere by means of a chimney or other outlet.

While we have illustrated our invention as having gas as a source of heat, it is evident that the source of heat may be electricity, coal or steam.

It will be evident by the construction hereinbefore described that the heated gases, or products of combustion, are directed over the entire outer surface of the cylinder and are directed through all of the different shelves and portions thereof on the interior of the cylinder.

It will be understood that in the operation of the device, the shelves may remain stationary while the baking operation is taking place, or the shelves may be rotated by means of the shaft 12 in any convenient and suitable manner. After the articles on the shelves have been baked, the doors 23 are opened and the articles removed from the shelves.

We claim:—

1. A baking oven having, in combination, a vertically positioned baking cylinder, a casing surrounding said cylinder with a vertically extending chamber between said casing and baking cylinder, a plurality of shelves with openings therethrough horizontally positioned within said cylinder and means to force heated gases upwardly in said chamber and into said cylinder and downwardly through the openings in said shelves and out of said cylinder.

2. A baking oven having, in combination, a vertically positioned baking cylinder, a casing surrounding said cylinder with a vertically extending chamber between said casing and baking cylinder, a flue leading outwardly and upwardly from said cylinder, a plurality of shelves with openings therethrough horizontally positioned within said cylinder and means to force heated gases upwardly in said chamber and into said cylinder and downwardly through the openings in said shelves and out of said cylinder and into said flue.

3. A baking oven having, in combination, a vertically positioned baking cylinder, a polygonal casing surrounding said cylinder with a plurality of vertically extending chambers between said casing and baking cylinder, a plurality of shelves with openings therethrough horizontally positioned within said cylinder and means to force heated gases upwardly in said chambers and into said cylinder and downwardly through the openings in said shelves and out of said cylinder.

4. A baking oven having, in combination, a vertically positioned baking cylinder, a casing surrounding said cylinder with a plurality of vertically extending chambers between said casing and baking cylinder and with a horizontal chamber extending across said baking oven between the top of said cylinder and the top of said casing, the top of said cylinder being provided with openings, a plurality of shelves with openings therethrough horizontally positioned within said cylinder, a flue extending out of the bottom of said cylinder and upwardly therefrom with openings into the atmosphere and into said horizontal chamber and means to force heated gases upwardly in said vertically extending chambers and into said cylinder and downwardly through the openings in said shelves and out of said cylinder and upwardly in said flue.

5. A baking oven having, in combination, a vertically positioned baking cylinder, a casing surrounding said cylinder with a plurality of vertically extending chambers between said casing and baking cylinder and with a horizontal chamber extending across said baking oven between the top of said cylinder and the top of said casing, the top of said cylinder being provided with openings, a plurality of shelves with openings therethrough horizontally positioned within said cylinder, a flue extending out of the bottom of said casing and upwardly therefrom with openings into the atmosphere and into said horizontal chamber, means to force heated gases upwardly in said vertically extending chambers and into said cylinder and downwardly through the openings in said shelves and out of said cylinder and upwardly in said flue, means to close the opening from said flue to the atmosphere and open the opening from said cylinder to said horizontal chamber and vice versa, whereby said heated gases may be caused to recirculate through said baking cylinder, or may be caused to pass directly to the atmosphere from said flue.

6. A baking oven having, in combination, a vertically positioned baking cylinder, a casing surrounding said cylinder with a plurality of vertically extending chambers between said casing and baking cylinder, a plurality of shelves with openings therethrough horizontally positioned and rotatably mounted within said cylinder and means to force heated gases upwardly in one of said chambers and into said cylinder and downwardly through the openings in said shelves and out of said cylinder.

7. A baking oven having, in combination, a vertically positioned baking cylinder, a casing surrounding said cylinder with a plurality of vertically extending chambers between said casing and baking cylinder, a plurality of shelves with openings therethrough horizontally positioned within said cylinder and means to force heated gases upwardly in one of said chambers and into said cylinder and downwardly through the openings in said shelves and out of said cylinder and means to guide the heated gases upwardly outside said cylinder and into and downwardly therethrough a second time.

8. A baking oven having, in combination, a vertically positioned baking cylinder, a casing surrounding said cylinder with a vertically extending chamber between said casing and baking cylinder, a horizontally positioned shelf in said cylinder constituting a grid and means to force heated gases upwardly in said chamber and into said cylinder and downwardly through the openings in said grid and out of said cylinder.

In testimony whereof we have signed our names to these specifications in the presence of the subscribing witnesses.

EZRA S. EATON,
WILLIAM W. CUMMINGS, Jr.

Witnesses:
LAURA L. DEAN,
ALLAN E. FISH.